United States Patent
Blatchley et al.

(10) Patent No.: US 10,783,463 B2
(45) Date of Patent: Sep. 22, 2020

(54) SYSTEM, METHOD AND PROGRAM FOR TRACKING LABOR COSTS

(75) Inventors: Robert David Blatchley, Longmont, CO (US); Donald Paul Taylor, III, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 2231 days.

(21) Appl. No.: 11/769,084

(22) Filed: Jun. 27, 2007

(65) Prior Publication Data
US 2009/0006171 A1    Jan. 1, 2009

(51) Int. Cl.
*G06Q 10/06* (2012.01)

(52) U.S. Cl.
CPC ....... *G06Q 10/06* (2013.01); *G06Q 10/06311* (2013.01)

(58) Field of Classification Search
CPC ............. G06Q 10/06; G06Q 10/06311; G06Q 10/109; G06Q 10/06398
USPC ...................................................... 705/9, 32
See application file for complete search history.

(56) References Cited

U.S. PATENT DOCUMENTS

| | | | |
|---|---|---|---|
| 4,195,220 A | 3/1980 | Bristol et al. | |
| 5,956,690 A | 9/1999 | Haggerson et al. | |
| 7,021,532 B2 | 4/2006 | Robinson et al. | |
| 2002/0062475 A1* | 5/2002 | Iborra | G06F 8/30 717/108 |
| 2003/0033167 A1* | 2/2003 | Arroyo | G06Q 10/06398 705/301 |
| 2003/0069815 A1* | 4/2003 | Eisenberg et al. | 705/32 |
| 2004/0267548 A1 | 12/2004 | Jones | |
| 2004/0267595 A1* | 12/2004 | Woodings | G06Q 10/06 705/7.14 |
| 2005/0004879 A1 | 1/2005 | Mathias et al. | |
| 2005/0052458 A1* | 3/2005 | Lambert | 345/440 |
| 2005/0187839 A1* | 8/2005 | Butera et al. | 705/32 |
| 2006/0059057 A1 | 3/2006 | Peterson et al. | |
| 2007/0100714 A1* | 5/2007 | Walker | 705/32 |

* cited by examiner

*Primary Examiner* — Bennett M Sigmond
*Assistant Examiner* — Michael D Cranford
(74) *Attorney, Agent, or Firm* — Schmeiser, Olsen & Watts, LLP; William Hartwell

(57) ABSTRACT

System, method and program for tracking labor expended concurrently by a person for a plurality of different projects or accounts. First program instructions generate a display of a list of the plurality of projects or accounts and a respective plurality of fields for the plurality of projects or accounts indicating whether labor expended by the person will be allocated to the respective plurality of projects or accounts. Second program instructions are responsive at least in part to the plurality of fields with indications that labor expended by the person will be allocated to the respective plurality of projects or accounts, by allocating a portion of elapsed time to each of the plurality of projects or accounts. The time can be allocated equally or unequally to the different projects or accounts as indicated by the person.

12 Claims, 4 Drawing Sheets

SYSTEM, METHOD AND PROGRAM FOR TRACKING LABOR COSTS

FIELD OF THE INVENTION

The invention relates generally to labor cost tracking, and more specifically to a technique to track labor expended for more than one project concurrently.

BACKGROUND OF THE INVENTION

There are many known techniques by which a person tracks his or her time expended for a project or customer/account. A manual technique is for the person to keep track of the time with a clock and manually fill-out a time sheet specifying the hours worked on each project or customer/account. A program tool was also known to track the amount of time a person works on a project or customer/account. With this known program tool, the person identifies the project or customer/account upon which the person will begin work by entering the name of the project or customer/account and indicating that a timer should begin. (For example, the person can be a computer help desk person, and the project can be a computer program or computer system which is down.) In response, the program tool starts the timer, and the timer runs until the person notifies the program tool that the person has completed work for the project or customer/account. At that time, the program tool subtracts the start time from the completion time to determine the number of hours that the person worked on the project or customer/account. Periodically, such as weekly, the program tool reports the number of hours that the person has worked on each project or customer/account. It was also known for the program tool to multiply the number of hours times a billing rate to automatically calculate the bill for each project or customer/account. While the foregoing system was effective, it was not suited for situations where the person concurrently worked on more than one project or customer/account. For example, occasionally there is a single problem that effects operation of multiple computer programs or computer systems, and a single person's efforts to solve that problem will benefit the multiple computer programs or computer systems. For example, multiple programs reside on the same computer, the computer is down or a network connection to the computer necessary for use of the multiple programs is down, and the person is attempting to fix the computer or the network connection to the computer. This labor concurrently benefits all of the multiple programs on the computer. As another example, a person may conduct an analysis or participate in a conference call discussing why multiple applications, sharing something in common, are not working. As another example, a person may participate in a conference explaining the status of multiple applications or discussing the requirements for multiple applications. In all these examples, labor expended by a single person benefits multiple projects or accounts/customers.

Accordingly, an object of the present invention is to properly track and allocate labor hours concurrently spent on two or more projects or customers/accounts.

SUMMARY OF THE INVENTION

The present invention resides in a system, method and program for tracking labor expended concurrently by a person for a plurality of different projects or accounts. First program instructions generate a display of a list of the plurality of projects or accounts and a respective plurality of fields for the plurality of projects or accounts indicating whether labor expended by the person will be allocated to the respective plurality of projects or accounts. Second program instructions are responsive at least in part to the plurality of fields with indications that labor expended by the person will be allocated to the respective plurality of projects or accounts, by allocating a portion of elapsed time to each of the plurality of projects or accounts.

According to one feature of the present invention, the second program instructions allocate an equal portion of the elapsed time to each of the plurality of projects or accounts.

According to another feature of the present invention, the first program instructions include in the display for each of the plurality of projects or accounts means for unevenly allocating the person's time to the plurality of projects or accounts.

DETAILED DESCRIPTION OF THE PREFERRED EMBODIMENTS

Figure 1:
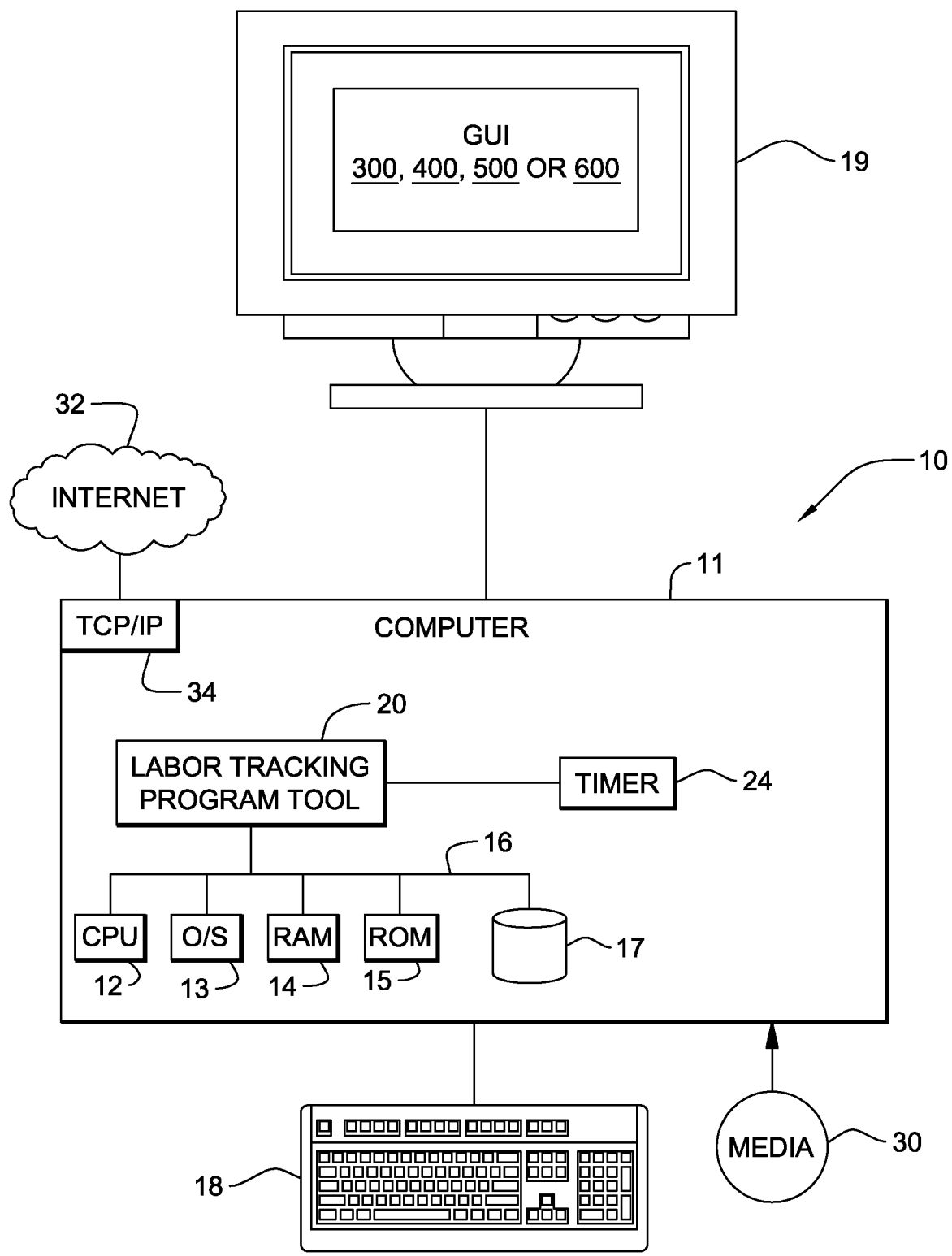
FIG. 1 is a block diagram of a computer system including a labor tracking program tool according to the present invention.

The present invention will now be described in detail with reference to the figures. FIG. 1 illustrates a computer system generally designated 10 in which the present invention is incorporated. System 10 includes a computer 11 with a known CPU 12, operating system 13, RAM 14 and ROM 15 on a common bus 16 and storage 17, keyboard 18 and monitor 19. Computer system 10 also includes a labor tracking program tool 20, executing in computer 11, according to the present invention. Labor tracking program tool 20 tracks labor hours allocated to one or more projects or customers/accounts. For example, if a person is concurrently working on a problem that impacts two or more projects or customers/accounts, then program tool 20 will track this concurrent work effort and divide the person's labor hours between the two or more projects. If the person has indicated a non equal allocation of his or her labor hours to different projects or customers/accounts, then program tool 20 will track and allocate the person's labor hours unequally between the different projects or customers/accounts as indicated by the person.

Figure 2:
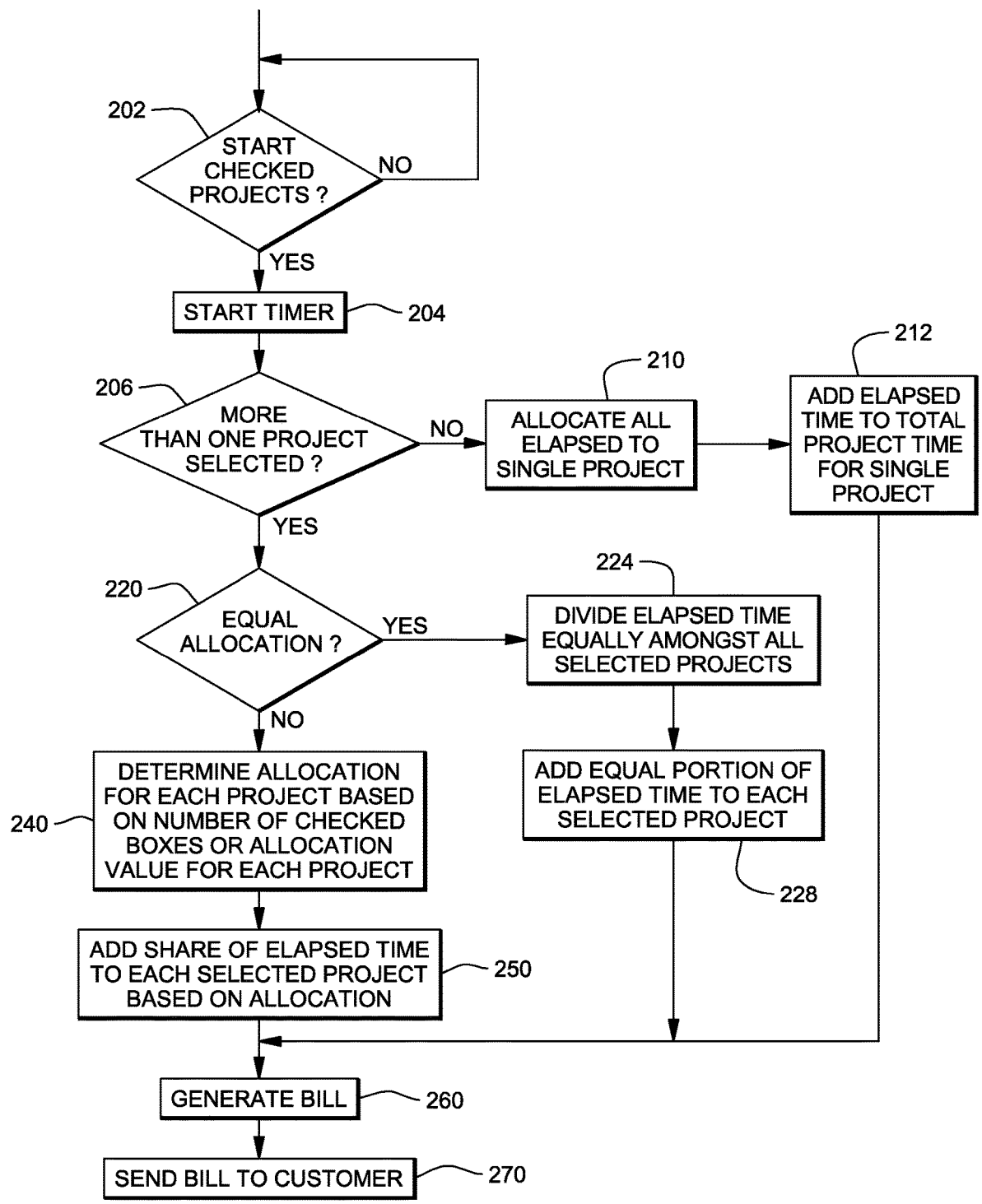
FIG. 2 is a flow chart of the labor tracking program tool, within the computer system of FIG. 1, according to the presentation invention.

FIG. 2 illustrates function and operation of labor tracking program tool 20 in more detail. In step 100, the person about to perform labor for one or more projects or customers/accounts invokes program tool 20. In response, program tool 20 generates and displays a graphical user interface ("GUI") in which the person can specify which projects or customers/accounts to concurrently allocate labor time and start the timer. Before explaining the remainder of the steps of program 20, the following examples are provided of GUIs and projects tracked by program 20.

Figure 3:
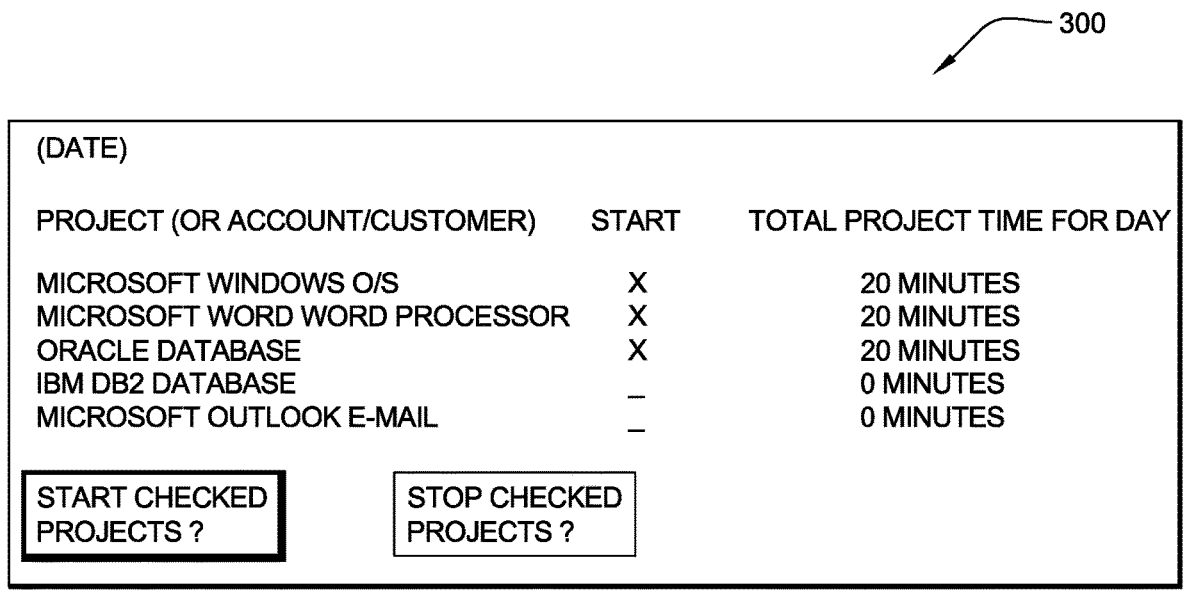
FIG. 3 is a diagram of a first graphical user interface for the labor tracking program tool of FIG. 2 and a first example of time allocation between different projects or customers/accounts.

FIG. 3 illustrates an example of such a GUI 300, with "Project or Account/Customer", "Start" and "Project Time" column headings. Upon the initial display of GUI 300 there are no data entries for the "Start" and "Project Time" columns. As illustrated in FIG. 3, the GUI includes a list of projects or customers/accounts for which the person is authorized to perform work, and the list is initially displayed upon invocation of program tool 20. Either the person or an administrator previously configured GUI 300 with the list of projects or customers/accounts for which the person is authorized to perform work. In the illustrated example, the list includes five computer programs identified by their actual names (such as Microsoft Windows operating system, Microsoft Word, Oracle database manager, IBM DB2 database manager, and Microsoft Outlook e-mail program), although for purposes of explanation herein, these are identified by respective alphabetic characters A, B, C, D and E.

For each entry in the Project column, GUI 300 includes a box (or field) in the "Start" column in a same row as a respective, named application indicating whether the timer should be Started for the respective application. If the Start box is checked (with a check mark, "X" or other indication of selection) in each of the first three rows (for Applications A, B and C) as illustrated, when the "Start Check Projects?" button is selected, then program tool 20 will allocate the labor hours equally between Applications A, B and C (33% for each of Applications A, B and C in the example illustrated in FIG. 3). In other words, for each hour of elapsed time that the timer has been started for Applications A, B and C, and these three boxes in the corresponding rows have remained checked, ⅓ hour will be allocated and charged to Application A, ⅓ hour will be allocated and charged to Application B and ⅓ hour will be allocated and charged to Application C. The last column with heading "Project Time", in real time, tracks elapsed time allocated to each Application having a checked box in the same row. In the example of FIG. 3, for each three seconds that passes, program 20 will add one second in real time to the "Total Project Time For Day" for each of Applications A, B and C. The example of FIG. 3 can represent a situation where Applications A, B and C reside on the same computer, the computer is down or a network connection to the computer necessary for use of Applications A, B and C is down, and the person is attempting to fix the computer or the network connection to the computer. This labor concurrently benefits all three Applications A, B and C, so the labor charge to correct this problem is equally divided between the three Applications A, B and C. FIG. 3 illustrates the state of GUI 300 after one hour of elapsed time where 20 minutes is allocated to each of Applications A, B and C. Next, program 20 automatically reports the time allocation for each Application, and multiplies the time allocation by the billing rate for the person to generate the bill for each Application.

Figure 4:
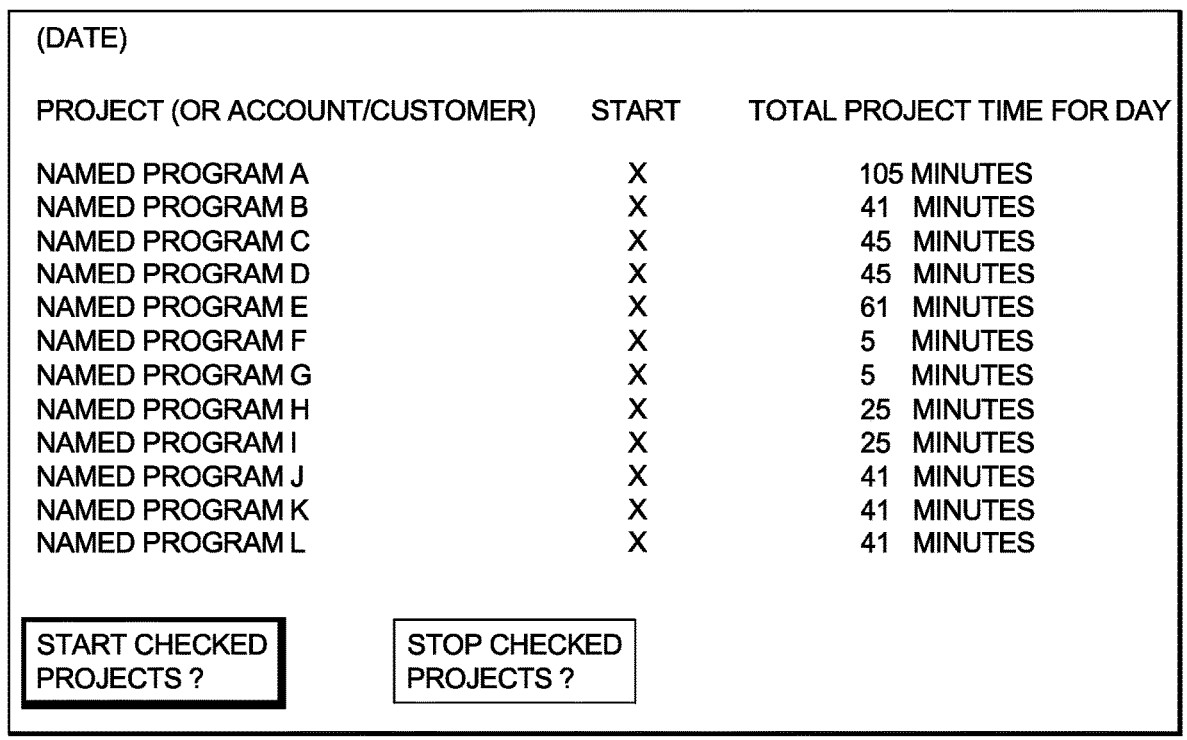
FIG. 4 is a diagram of a second graphical user interface for the labor tracking program tool of FIG. 2 and a second example of time allocation between different projects or customers/accounts.

FIG. 4 illustrates another example of a GUI 400 which allocates and tracks a person's labor activities during a day using program 20. In this example, twelve different computer programs are assigned to the person. In actual use, GUI 400 lists in its first column the actual names of the twelve computer programs, although for ease of illustration and explanation, these twelve computer programs are simply named Programs A-L in FIG. 4. Initially, none of the boxes in the Start column are checked. The first task for the person is to participate in a teleconference for Application A. At the start of the teleconference, the person checks the Start box for Application A. (No other Applications have their Start box checked at this time.) The teleconference lasts one hour, and at the end of the one hour, program 20 has added one hour to the "Project Time" for Application A. At that time, the person begins an analysis of why Applications A, C and D are not working correctly, so the person checks the Start box for Application C and the Start box for Application D. (The Start box for Application A is still checked from the prior task.) The "Start Checked Projects?" button is still selected. The analysis lasts for two hours, and during lapse of each three seconds, program 20 adds one second to the "Total Project Time For Day" for each of Applications A, C and D. At the end of the two hours, program 20 has added a total of forty minutes to the "Total Project Time For Day" for each of Applications A, C and D. Next, the person begins a one hour conference to discuss Applications E, H and I. So, the person unchecks the Start boxes next to respective Applications A, C and D, and checks the Start box next to each of Applications E, H and I. During lapse of each three seconds, program 20 will add one second to the Project Time for Applications E, H and I. At the end of the hour, twenty minutes has been added to the Project Time for each of Applications E, H and I. At that time, the person begins a three hour review of requirements for Applications B, E, J, K and L. So the person, unchecks the Start boxes for Applications H and I and checks the Start box next to each of Applications B, J, K and L. The Start box next to Application B remains checked. For each lapse of five seconds, program 20 adds one second to the "Total Project Time For Day" for Applications B, E, J, K and L. At the end of the three hours, program 20 has added thirty-six minutes to the Project Time for Applications B, E, J, K and L. At that time, the person begins a one hour conference to discuss status of all twelve Applications A-L. So, the person checks the Start box next to each of Applications A, C, D, F, G, H and I. The Start boxes next to each of Applications B, E, J, K and L remain checked from the prior task. (This is the state of the Start column illustrated in FIG. 4.) During lapse of each twelve seconds, program 20 adds one second to the Project Time for each of Applications A-L. At the end of one hour, program 20 has added five minutes to the Project Time for each of Applications A-L. At the end of the eight hour day, program has billed a total of eight hours between Applications A-L as follows:

Application A – 1 hour 45 minutes.
Application B – 0 hours 41 minutes.
Application C – 0 hours 45 minutes.
Application D – 0 hours 45 minutes.
Application E – 1 hour 01 minutes.
Application F – 0 hours 5 minutes.
Application G – 0 hours 5 minutes.
Application H – 0 hours 25 minutes.
Application I – 0 hours 25 minutes.
Application J – 0 hours 41 minutes.
Application K – 0 hours 41 minutes.
Application L – 0 hours 41 minutes.
Total = 480 minutes = 8 hours.

Next, program 20 automatically reports the time allocation for each Application, and multiplies the time allocation by the billing rate for the person to generate the bill for each Application.

Figure 5:
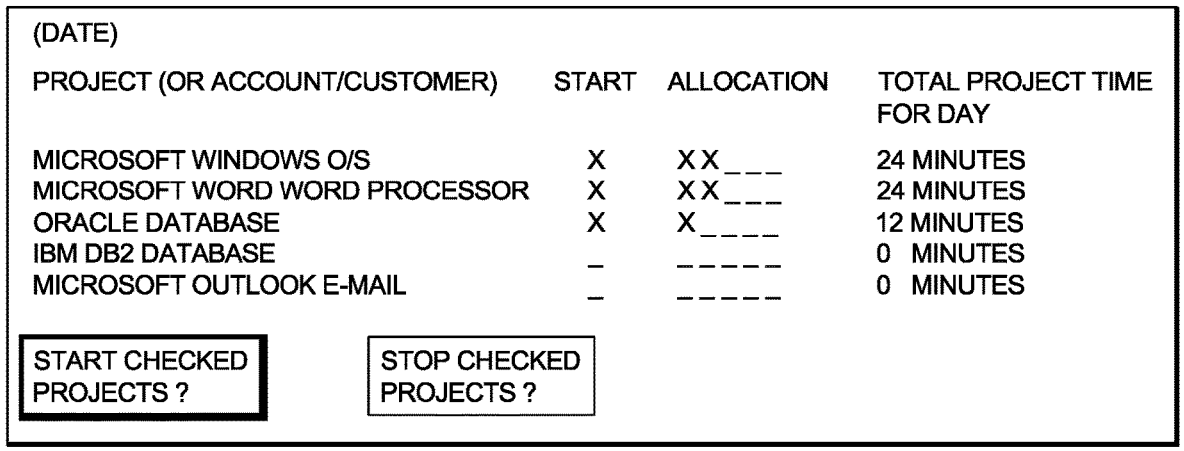
FIG. 5 is a diagram of at third graphical user interface for the labor tracking program tool of FIG. 2 and a third example of time allocation between different projects or customers/accounts.

FIG. 5 illustrates another example of a GUI 500 to accommodate unequal division of labor charges amongst different projects or accounts/customers when a person concurrently works on multiple projects (for example, Applications), but for some rational reason, allocates the labor charges unequally. In GUI 500, in addition to a Start box next to each entry in the Project column, for each entry in the Project column, GUI 500 also includes a series of boxes (or fields) (such as five) in the Allocation column in a same row as a respective, named project. If one or more of the boxes in the Allocation column in a row is checked (with a check mark, "X" or other indication of selection), this indicates that labor hours will be tracked and allocated to the respective project. If one or more boxes in more than one row of the Allocation column are concurrently checked, then the labor hours will be divided between the two or more projects of those rows. The number of boxes checked in each row indicates the relative weighting of allocation of the labor charge for the respective project. FIG. 5 illustrates an example where the person has checked two boxes in the first row for Application A, two boxes in the second row for Application B and one box in the third row for Application C. (A total of five boxes in three rows have been checked.) The person has also checked the Start box for each of the Applications A, B and C. Consequently, program 20 will track and allocate ⅖ of the elapsed time for Application A, ⅖ of the elapsed time for Application B and ⅕ of the elapsed time for Application C. The example of FIG. 5 can represent a situation where Applications A, B and C reside on the same computer, the computer is down or the network connection to the computer necessary for use of Applications A, B and C is down, and the person is attempting to fix the computer or the network connection to the computer. This labor concurrently benefits all three Applications A, B and C. However, Application A and Application B each have twice the value or twice the number of users as Application C, so Application A and Application B are each billed twice as much as Application C.

Figure 6:
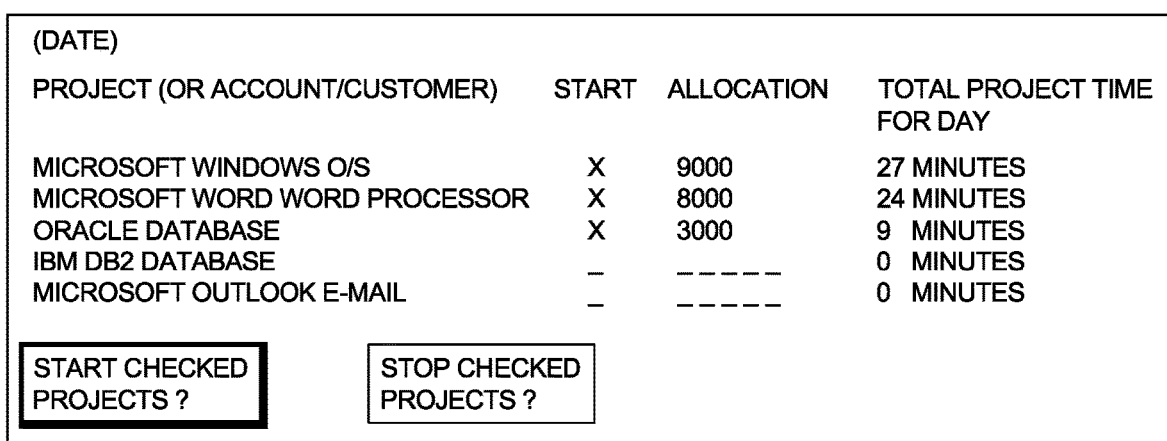
FIG. 6 is a diagram of a fourth graphical user interface for the labor tracking program tool of FIG. 2 and a fourth example of time allocation between different projects or customers/accounts.

FIG. 6 illustrates another example of a GUI 600, where instead of checking boxes in the Allocation column, the person enters (typed-in) a relative value for each project to indicate a respective weight for the billing allocation. In the illustrated example, the person has entered the relative value "9000" in the Allocation field for the first row for Application A, the relative value "8000" in the Allocation field for the second row for Application B, and the relative value "3000" in the Allocation field for the third row for Application C. Program 20 will track and allocate Total Elapsed Time times 90/(90+80+30) for Application A, Total Elapsed Time times 80/(90+80+30) for Application B and Total Elapsed Time times 30/(90+80+30) for Application C. The example of FIG. 6 can represent a situation where Applications A, B and C reside on the same computer, the computer is down or network connection to the computer necessary for use of Applications A, B and C is down, and the person is attempting to fix the computer or the network connection to the computer. This labor concurrently benefits all three Applications A, B and C. However, Application A has a relative value of "9000", Application B has a relative value of "8000", and Application C has a relative value of "3000", so Application A is billed 45% of the elapsed time, Application B is billed 40% of the elapsed time, and Application C is billed 15% of the elapsed time. For example, there are 9000 users of Application A, 8000 users of Application B and 3000 users of Application C, and the number of users indicates the relative value of the respective Application. Alternately, the person can enter into each row a percentage of time to be allocated to the respective Application, where all the percentages in the different rows total 100%.

Referring again to FIG. 2, after program 20 initiates display of the original GUI 300, 400, 500 or 600 (without any entries for the "Start" column or "Total Project Time For Day" column), the person enters data for the "Start" column" and program 20 waits until the person selects the "Start Checked Projects?" button (decision 202). When the person selects the "Start Checked Projects?" button (decision 202, yes branch), then program 20 starts a timer 24. Next, program 20 determines if more than one project has been selected for time allocation by determining if more than one "Start" box has been selected for more than one project (decision 204). If only a single project (for example, a single Application) has been selected for time allocation (decision 206, no branch), then program 20 records all elapsed time indicated by timer 24 into the "Total Project Time for Day" field for the single selected project (step 210). This is a real time allocation, so as timer 24 advances each second, program 20 adds a second to the "Total Project Time for Day" for the single selected project in step 210 (step 212). However, if the person has selected more than one "Start" box (decision 206, yes branch), then program 20 determines if the person has indicated equal or unequal allocations for the selected projects (decision 220). If the person has selected equal allocations for the selected Applications (decision 220, yes branch), then program 20 equally divides the elapsed time indicated by timer 24 amongst the selected Applications (step 224). To indicate equal allocations for decision 220 in GUIs 300 and 400, the person can select the Start boxes for more than one project. To indicate equal allocations for decision 220 in GUI 500, the person can select the Start boxes for more than one project and select the same number of allocation boxes for each selected project in the Allocation column. To indicate equal allocations for decision 220 in GUI 500, the person can select the Start boxes for more than one project and enter the same relative value for each selected project in the Allocation column for GUI 600. After dividing the elapsed time equally amongst the number of selected projects in step 224, program 20 adds the equal portions of elapsed time to the "Total Project Time For Day" for each selected project (step 228). Program 20 increments the "Total Project Time For Day" in real time for each selected project, second by second. For example, if there are three selected projects, for every three seconds of elapsed time, program 20 adds one second to the "Total Project Time For Day" for each of the selected projects. Refer again to decision 220, no branch, where the person has indicated an unequal allocation of time to the selected projects. To indicate unequal allocations for decision 220 in GUI 500, the person can select the Start boxes for more than one project and select different numbers of allocation boxes for different projects in the Allocation column. To indicate unequal allocations for decision 220 in GUI 600, the person can select the Start boxes for more than one project and enter different relatives value for some projects in the Allocation column. If the person has indicated an unequal allocation of time to the selected projects (decision 220, no branch), then program 20 determines the allocation of elapsed time to each project (step 240). For GUI 500, program 20 divides the number of boxes selected for each Application by the total number of boxes selected for all selected projects. For GUI 600, program 20 divides the relative value entered for each project by the total of relative values entered for all selected projects. Next, program 20 adds the share of elapsed time (in real time) to each selected project (step 250). In the example of GUI 500, for every five seconds of elapsed time, program 20 adds two seconds to the "Total Project Time For Day" to projects A and B, and one second to the "Total Project Time For Day" to project C. At the end of each day, program 20 generates a bill for each project or account/customer based on the number of labor hours allocated to the project or account/customer times the billing rate of the person (step 260). At the end of each billing period, program 20 sends the bill to the customer or entity responsible for the bill (step 270).

Labor tracking program tool 20 can be loaded into computer 11 from a computer readable media 30 such as magnetic tape or disk, DVD, optical media, memory stick, semiconductor memory, etc. or downloaded from the Internet 32 via a TCP/IP adapter card 34.

Based on the foregoing, a computer system, method and program for tracking labor concurrently expended for multiple projects or accounts/customers have been disclosed. However, numerous modifications and substitutions can be made without deviating from the scope of the present invention. For example, program tool 20 can reside in a remote server and provide the foregoing GUIs to computer 11 via a network such as the Internet. In such a case, the remote server provides the user interfaces as web pages (HTML) or using a Microsoft Java™ application. Therefore, the present invention has been disclosed by way of illustration and not limitation, and reference should be made to the following claims to determine the scope of the present invention.

What is claimed:

1. A method for real time displaying, on a graphical user interface (GUI), of real time expended by a person concurrently for plurality of different projects or accounts for subsequent billing of the projects or accounts, the method comprising the steps of:
  a computer displaying on the GUI: (i) a Projects column, in a first display region of the GUI, including a list of the plurality of projects or accounts for which the person is authorized to perform work, (ii) a Start column, in a second display region of the GUI, including an active or inactive status indicating whether or each project or account is being billed during successive intervals of real time, respectively, expended by a person (iii) a Project Time column, in a third display region of the GUI, for recording real time subsequently expended by the person and divided among the plurality of projects or accounts, for billing, whose status in the Start column is active, (iv) a start-timer button, in a fourth display region of the GUI, whose selection initiates recording, in the Project Time column for each subsequent interval of real time, real time expended by the person divided among the projects or accounts whose status in the Start column is active, and (v) a stop-timer button, in a fifth display region of the GUI, whose selection stops said recording;
  during each cycle of a plurality of cycles, the computer receiving from the person an indication in the Start column of whether or not each project or account has an active or inactive status, respectively, and in response, the computer adding in the Project Time column, for each interval of real tune, an amount of real time expended by the person, in the interval of real time, divided among the projects or accounts whose status in the Start column is active, wherein, for at least two cycles of the plurality of cycles, a different group of at least two projects or accounts have the active status in the Start column, and wherein during an initial cycle of the plurality of cycles, the computer receiving from the person a selection of the start-timer button after said receiving the indication for all of the projects or accounts, and wherein during a last cycle of the plurality of cycles, the computer receiving a selection by the person of the stop-timer button and in response, the computer stopping said adding;
  the computer multiplying the respective portion of the expended real time allocated to each of the projects or accounts by a billing rate for the person to generate a bill amount for the respective project or account attributed to labor of the person; and wherein the portion of expended real time and corresponding bill amount for each of the projects or accounts are greater than zero; and
  the computer sending the bill for the bill amount to each respective project or account.

2. The method of claim 1, wherein the real time expended by the person, recorded in the Project Time column for each interval of real time, is equally divided among the projects or accounts whose status in the Start column is active.

3. The method of claim 1, wherein the real time expended by the person, recorded in the Project Time column for each interval of real time, is unequally divided among the projects or accounts whose status in the Start column is active.

4. The method of claim 3, wherein the method further comprises:
  the computer further displaying (vi) an Allocation column a sixth display region of the GUI, a weight for each project or account, wherein the adding step uses the weights to determine how the real time expended by the person, recorded in the Project Time column for each interval of real time, is unequally divided among the projects or accounts whose status in the Start column is active.

5. A computer program product, comprising one or more computer readable hardware storage devices having computer readable program code stored therein, said program code containing instructions executable by one or more processors of a computer system to implement a method for real time displaying, on a graphical user interface (GUI), of real time expended by a person concurrently for a plurality of different projects or accounts for subsequent billing of the projects or accounts, the method comprising the steps of:
  a computer displaying on the GUI: (i) a Projects column, in a first display region of the GUI, including a list of the plurality of projects or accounts for which the person is authorized to perform work, (ii) a Start column, in a second display region of the GUI, including an active or inactive status indicating whether or not each project or account is being billed during successive intervals of real time, respectively, expended by a person (iii) a Project Time column, in a third display region of the GUI, for recording real time subsequently expended by the person and divided among the plurality of projects or accounts, for billing, whose status in the Start column is active, (iv) a start-timer button, in a fourth display region of the GUI, whose selection initiates recording, in the Project Time column for each subsequent interval of real time, real time expended by the person divided among the projects or accounts whose status in the Start column is active, and (v) a stop-timer button, in a fifth display region of the GUI, whose selection stops said recording;

during each cycle of a plurality of cycles, the computer receiving from the person an indication in the Start column of whether or not each project or account has an active or inactive status, respectively, and in response, the computer adding in the Project Time column, for each interval of real time, an amount of real time expended by the person, in the interval of real time, divided among the projects or accounts whose status in the Start column is active wherein, for at least two cycles of the plurality of cycles, a different group of at least two projects or accounts have the active status in the Start column, and wherein during an initial cycle of the plurality of cycles, the computer receiving from the person a selection of the start-timer button after said receiving the indication for all of the projects or accounts, and wherein during a last cycle of the plurality of cycles, the computer receiving a selection by the person of the stop-timer button and in response, the computer stopping said adding;

the computer multiplying the respective portion of the expended real time allocated to each of the projects or accounts by a billing rate for the person to generate a bill amount for the respective project or account attributed to labor of the person; and wherein the portion of expended real time and corresponding bill amount for each of the projects or accounts are greater than zero; and the computer sending the bill for the bill amount to each respective project or account.

6. The computer program product of claim 5, wherein the real time expended by the person, recorded in the Project Time column for each interval of real time, is equally divided among the projects or accounts whose status in the Start column is active.

7. The computer program product of claim 5, wherein the real time expended by the person, recorded in the Project Time column for each interval of real time, is unequally divided among the projects or accounts whose status in the Start column is active.

8. The computer program product of claim 7, wherein the method further comprises:

the computer further displaying (vi) an Allocation column, in a sixth display region of the GUI, a weight for each project or account, wherein the adding step uses the weights to determine how the real time expended by the person, recorded in the Project Time column for each interval of real time, is unequally divided among the projects or accounts whose status in the Start column is active.

9. A computer system, comprising a computer, said computer comprising a graphical user interface (GUI), one or more processors, one or more memories, and one or more computer readable hardware storage devices, said one or more hardware storage device containing program code executable by the one or more processors via the one or more memories to implement a method for real time displaying, on the GUI, of real time expended by a person concurrently for a plurality of different projects or accounts for subsequent billing of the projects or accounts, the method comprising the steps of:

the computer displaying on the GUI: (i) a Projects column, in a first display region of the GUI, including a list of the plurality of projects or accounts for which the person is authorized to perform work, (ii) a Start column, in a second display region of the GUI, including an active or inactive status indicating whether or not each project or account is being billed during successive intervals of real time, respectively, expended by a person (iii) a Project Time column, in a third display region of the GUI, for recording real time subsequently expended by the person and divided among the plurality of projects or accounts, for billing, whose status in the Start column is active, (iv) a start-timer button, in a fourth display region of the GUI, whose selection initiates recording, in the Project Time column for each subsequent interval of real time, real time expended by the person divided among the projects or accounts whose status in the Start column is active, and (v) a stop-timer button, in a fifth display region of the GUI, whose selection stops said recording;

during each cycle of a plurality of cycles, the computer receiving from the person an indication in the Start column of whether or not each project or account has an active or inactive status, respectively, and in response, the computer adding in the Project Time column, for each interval of real time, an amount of real time expended by the person in the interval of real time, divided among the projects or accounts whose status in the Start column is active, wherein, for at least two cycles of the plurality of cycles, a different group of at least two projects or accounts have the active status in the Start column, and wherein during an initial cycle of the plurality of cycles, the computer receiving from the person a selection of the start-timer button after said receiving the indication for all of the projects or accounts, and wherein during a last cycle of the plurality of cycles, the computer receiving a selection by the person of the stop-timer button and in response, the computer stopping said adding, the computer multiplying the respective portion of the expended real time allocated to each of the projects or accounts by a billing rate for the person to generate a bill amount for the respective project or account attributed to labor of the person; and wherein the portion of expended real time and corresponding bill amount for each of the projects or accounts are greater than zero; and the computer sending the bill for the bill amount to each respective project or account.

10. The computer system of claim 9, wherein the real time expended by the person, recorded in the Project Time column for each interval of real time, is equally divided among the projects or accounts whose status in the Start column is active.

11. The computer system of claim 9, wherein the real time expended by the person, recorded in the Project Time column for each interval of real time, is unequally divided among the projects or accounts whose status in the Start column is active.

12. The computer system of claim 11, wherein the method further comprises:

the computer further displaying (vi) an Allocation column, in a sixth display region of the GUI, a weight for each project or account, wherein the adding step uses the weights to determine how the real time expended by the person, recorded in the Project Time column for each interval of real time, is unequally divided among the projects or accounts whose status in the Start column is active.

* * * * *